June 16, 1925.

W. H. PAYNE

MEANS FOR PROTECTING FURNACE ELECTRODES

Filed April 18, 1923

1,542,716

Inventor
William H. Payne
By William L. Symons
Attorney

Patented June 16, 1925.

1,542,716

UNITED STATES PATENT OFFICE.

WILLIAM H. PAYNE, OF PITTSBURGH, PENNSYLVANIA.

MEANS FOR PROTECTING FURNACE ELECTRODES.

Application filed April 18, 1923. Serial No. 632,849.

*To all whom it may concern:*

Be it known that I, WILLIAM H. PAYNE, a citizen of the United States of America, residing at Pittsburgh, in the county of Allegheny and State of Pennsylvania, have invented certain new and useful Improvements in Means for Protecting Furnace Electrodes, of which the following is a specification.

This invention relates to electric furnaces and more particularly to furnaces of the resistance type in which stationary electrodes are arranged with their ends in contact with a molten charge or electrolyte.

While the invention is especially designed for use in connection with glass melting furnaces, it is, of course, also applicable to other purposes.

In electric furnaces of this type, great difficulty has heretofore been experienced on account of the oxidation of the graphite electrodes at the point where they pass through the furnace wall. It will be understood that the electrodes at this point are at a comparatively high temperature, due to the proximity of the molten charge, and that oxidation thereof is caused by the air which percolates in around the electrode and enters the space between the electrode and the inner surface of the opening in the furnace wall through which the electrode extends. It has been found that even where the outer end of this space is sealed by means of some suitable cement, still sufficient air will filter or seep through the relatively porous refractory material of which the furnace wall is made, to produce oxidation and rapid wasting away of the electrode.

It is therefore the primary object of the present invention to devise means for preventing the oxidation of such electrodes at the point where they pass through the furnace wall, as described.

Of course it might be possible to water-cool the electrodes so effectively as to prevent them from reaching the oxidizing temperature, but even if this could be done, it would entail too great a loss of heat, and would therefore be too wasteful for commercial use.

I propose to prevent oxidation of the electrodes by surrounding them, inside of the furnace wall, with an envelope of a neutral or non-oxidizing gas, under pressure, whereby all atmospheric air is expelled and excluded from around the electrodes.

In order that the invention may be readily understood, reference is had to the accompanying drawing, forming part of this specification, and in which:—

Figure 1:
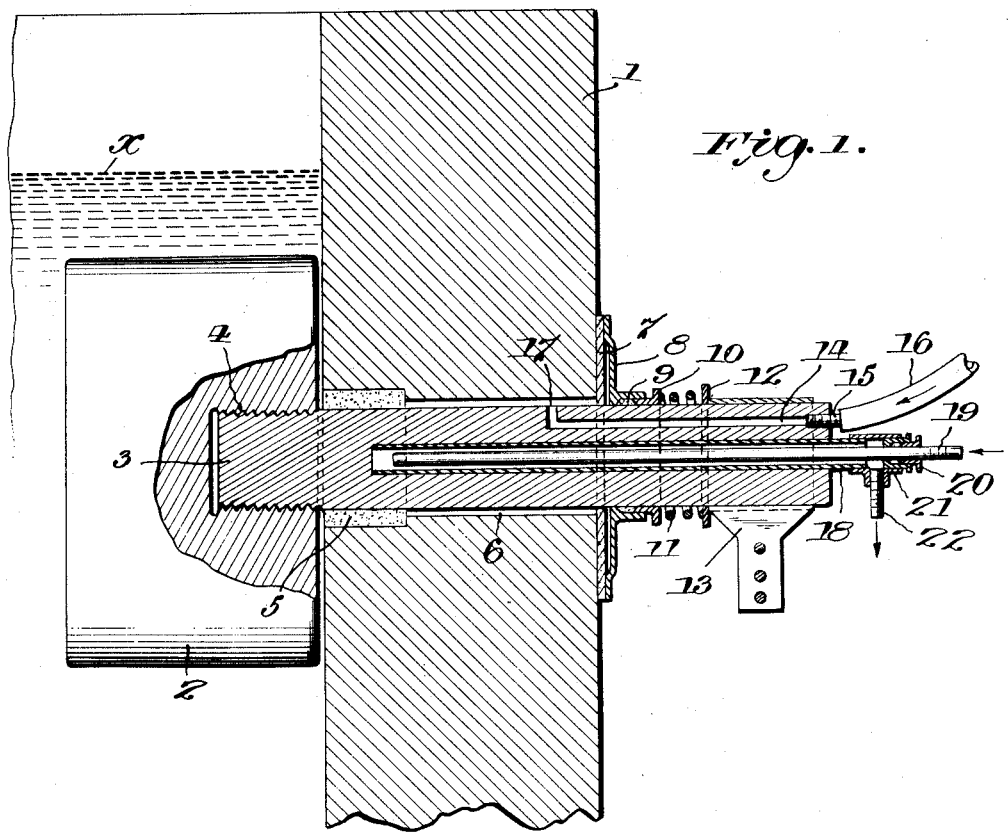
Figure 2:
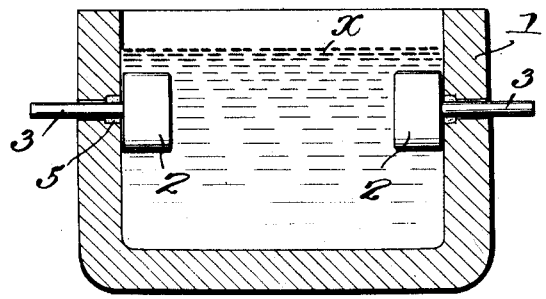

Fig. 1 is an enlarged fragmentary vertical section through the furnace wall and an electrode, showing my improved method of protecting the latter from oxidation; and Fig. 2 is a vertical section on a smaller scale through a conventional type of glass melting furnace, showing the arrangement of electrodes.

Referring to the drawings in detail, the furnace or crucible is designated at 1, and is constructed of any suitable refractory material. When in operation, it is filled with molten glass or other fused electrolyte to a level such as indicated by $x$. 2 designates electrode blocks, formed of graphite or the like, which are secured to the inner ends of the electrodes, indicated at 3, by means of screw threads 4, or the like.

The electrodes 3 pass loosely through openings formed in the furnace wall, so that an annular space 6 is provided between each electrode and the inner surface of the opening. The end of this space adjacent the interior of the furnace is preferably enlarged and is sealed by means of a suitable cement 5, preferably comprising a special fluxing mixture having as a base, part of the "batch" from which the glass being melted is made.

In order to seal the outer end of the annular space 6, I provide a disk or gasket 7 of soft material such as asbestos or the like, and over this is placed a clamping plate 8, both the disk 7 and plate 8 snugly surrounding the electrode 3. The plate 8 has a stuffing box or gland comprising suitable packing 9 and a collar 10, the latter being mounted on the electrode. A compression spring 11 surrounds the electrode and bears at one end against the collar 10 and at the other end against a collar 12, which in turn bears against the cable hanger 13, which, as usual, is clamped around the electrode and serves to receive the terminal of the cable conveying current to the electrode. Thus, the spring 11 urges the plate 8 toward the furnace wall and causes it to bear tightly against the packing disk 7, thus making a substantially gas tight joint.

A bore or passageway 14 extends through the interior of the electrode 13 longitudinally thereof and is provided at its outer end with a nipple or other fitting to which a hose 16 may be attached. The passageway 14 extends inwardly to a point within the annular space 6 and a port 17 is provided connecting the passageway 14 with the annular space 6. In practice, the hose 16 is connected with a source of neutral or non-oxidizing gas, such as nitrogen, carbon dioxide or the like, under pressure slightly in access of that of the atmosphere. This gas therefore flows in through the passage 14 and port 17 and fills the annular space 6, thus entirely surrounding that portion of the electrode within the furnace wall, with a mantle or envelope of gas. Due to the porosity of the furnace wall, and to other causes, this gas will of course, gradually leak away, but additional gas is constantly supplied through the hose 16 in such a manner as to maintain the pressure in the annular space 6 and thus completely and effectively exclude all air from this space.

Instead of introducing a gas, as described, I may feed in a small quantity of some volatile liquid, such as a light hydrocarbon, which is at once vaporized by the heat, and thus fills the space 6 with a non-oxidizing gas or vapor.

It will be understood that, in operating a furnace of the character referred to, the inner end of the electrode is at a very high temperature, while the outer end, being exposed, as it is, to the air, must be kept below the oxidizing temperature. To produce this large temperature drop within the short distance of the thickness of the furnace wall, and to maintain the outer end of the electrode within desirable limits of temperature, I preferably make use of water cooling.

The preferred form of this water cooling arrangement comprises a central bore or passage extending well into the electrode from the outer end thereof, and having a pipe 18 fitted therein. To the outer end of the pipe 18 is secured a T 21 or the like, and through this T and into the pipe 18 extends a smaller pipe 19, being held by a suitable packing gland 20 and so positioned as to produce an annular passageway between itself and the pipe 18. A nipple 22 is screwed into the T 21 and communicates with this annular passageway. Water or other cooling medium is fed into the end of pipe 19, as by means of a hose or the like, and flows outwardly through the annular passageway between the pipe 18 and 19, escaping from the nipple 22, thus producing an effective cooling action. It will be observed, however, that these cooling pipes do not extend to the extreme inner end of the electrode, since, as above explained, this would produce too great a waste of heat. The cooling should only be sufficient to keep the outer portion of the electrode below the oxidation point, while oxidation of the hotter portion within the furnace wall, is prevented by the envelope of gas.

By the means above shown and described, I have found that the oxidation and wasting away of the electrode may be almost entirely prevented, and this at comparatively small cost, and it is thought that the many advantages of my improved arrangement will be readily appreciated by those skilled in such matters.

What I claim is:—

1. The combination with an electric furnace, of a stationary electrode of carbonaceous material extending through the wall thereof, and means for maintaining a circulation of non-oxidizing gas around a portion of the electrode inside said wall to prevent oxidation thereof.

2. The combination with an electric furnace having an opening through the wall thereof, of a stationary electrode of carbonaceous material loosely fitting in said opening, and means for maintaining a flow of neutral gas around said electrode within and through said opening to prevent oxidation of said electrode.

3. The combination with an electric furnace having an opening through the wall thereof, of a stationary electrode of carbonaceous material loosely fitting in said opening, means for sealing both ends of said opening around said electrode, and means for introducing a non-oxidizing gas under pressure into the annular space between said electrode and the walls of said opening.

4. The combination with an electric resistance furnace adapted to contain a molten bath, of a stationary electrode of carbonaceous material extending through and sealed in the side wall thereof, at a point below the level of the molten bath, and means for maintaining an envelope of neutral gas around a portion of said electrode inside said wall to prevent oxidation thereof.

5. The combination with an electric resistance furnace adapted to contain a molten bath and having an opening through the side wall thereof at a point below the level of such bath, of an electrode loosely fitting in said opening, means sealing the inner end of said opening around the electrode, a plate surrounding said electrode and sealing the outer end of said opening, means for resiliently urging said plate toward the wall of the furnace, and means for introducing a gas under pressure into the closed annular space between the electrode and inner surface of said opening.

6. The combination with an electric resistance furnace adapted to contain a molten bath and having an opening through the side wall thereof at a point below the level of such bath, of an electrode loosely fitting in said opening, means sealing the inner end of said opening around the electrode, a plate surrounding said electrode at the outer end of said opening, packing material interposed between said plate and the wall of the furnace, a spring surrounding said electrode and bearing against said plate so as to urge it toward the furnace wall and thus seal the outer end of said opening, and means for introducing a gas under pressure into the sealed annular space between said electrode and the inner surface of said opening.

7. The combination with an electric furnace having an opening through the wall thereof, of a stationary electrode of carbonaceous material loosely fitting in said opening, said electrode having a passage extending longitudinally thereof from its outer end through the side of the electrode at a point within said opening and means connecting the outer end of said passage with a source of gas under pressure.

8. The combination with an electric furnace having an opening through the wall thereof, of a stationary electrode of carbonaceous material loosely fitting in said opening, and means for maintaining an envelope of neutral gas around said electrode within said opening, said means including a passageway formed through the interior of the electrode itself.

9. The combination with an electric furnace, of a stationary electrode of carbonaceous material extending through the wall thereof, means for setting up a circulation of cooling fluid through the interior of said electrode, and means for producing an envelope of neutral gas around a portion of said electrode inside of said wall.

In testimony whereof I affix my signature.

WILLIAM H. PAYNE.